United States Patent [19]

Hachem et al.

[11] Patent Number: 5,572,545
[45] Date of Patent: Nov. 5, 1996

[54] PROCESS FOR STARTING UP A MODEM CONTAINING A VARIABLE-PHASE ECHO CANCELLER AND MODEM IN WHICH SUCH A PROCESS IS IMPLEMENTED

[75] Inventors: Walid Hachem, Paris; Philippe Lamballe, La Baule; Catherine Picart, Wissous, all of France

[73] Assignee: U.S. Philips Corporation, New York, N.Y.

[21] Appl. No.: 302,565

[22] Filed: Sep. 8, 1994

[30] Foreign Application Priority Data

Sep. 13, 1993 [FR] France .................................. 93 10871

[51] Int. Cl.$^6$ .................................................. H04B 3/23
[52] U.S. Cl. ........................ 375/222; 379/411; 370/32.1
[58] Field of Search .......................... 379/411; 375/222; 370/32.1

[56] References Cited

U.S. PATENT DOCUMENTS 5,351,291   9/1994   Menez et al. ......................... 379/411

FOREIGN PATENT DOCUMENTS 0318105   5/1989   European Pat. Off. .
0334442   9/1989   European Pat. Off. .

OTHER PUBLICATIONS

Park, K. H., and Macchi, O., "A Phase–Adaptive Echo Canceller with Reduced Sensitivity to Power Variations," IEEE Trans. on Communications, vol. COM–35, No. 8, Aug. 1987, pp. 865–867.

Richard D. Gitlin et al, "A Phase Adaptive Structure for Echo Cancellation", IEEE Trans. on Communication, vol. COM–26, No. 8, Aug. 1978, pp. 1121–1220.

Edward A. Lee et al, "Digital Communication", Kluwer Academic Publishers, Boston, 1988, pp. 642–668.

Primary Examiner—Stephen Chin
Assistant Examiner—Jeffrey W. Gluck
Attorney, Agent, or Firm—Leroy Eason

[57] ABSTRACT

A start-up method for a data modem having an echo cancelling loop between the send port and receive port, the loop including a transversal filter having adjustable coefficients, adjustable phase-shifter and a subtractor for subtracting send port data symbols which have been filtered and phase shifted from data symbols received at the receive port. During start-up, in response to a series of data symbols supplied at the send port, a microprocessor iteratively adjusts the filter coefficients and the phase shift to cancel any echo at the output of the subtractor. In order to reduce the convergence time, the start-up method includes estimating the power of the echo over a time period corresponding to a predetermined number of data symbols at the send port, quantizing the estimated power, and adjusting the filter coefficients and the phase shift on the basis of the quantized echo power level.

4 Claims, 2 Drawing Sheets

PROCESS FOR STARTING UP A MODEM CONTAINING A VARIABLE-PHASE ECHO CANCELLER AND MODEM IN WHICH SUCH A PROCESS IS IMPLEMENTED

BACKGROUND OF THE INVENTION

1. Field of the Invention

The present invention relates to a modem for use in a data transmission system, the modem comprising a data send port for sending data to a remote apparatus, a data receive port for receiving data originating from the remote apparatus, and echo cancelling means. The latter consists of filtering means having adjustable coefficients and phase-shifting means cascaded therewith for supplying filtered and phase-shifted information, originating from the send port to a subtraction means for subtraction from the data received at the receive port. Control means adjusts the filtering means and the phase-shifting means so that said subtraction cancels out any possible echo at the output of the subtraction means arising in transmission between the modem and the remote apparatus.

2. Description of the Related Art

A modem of this kind is described in published European Patent Application No. 0 334 442. Although this provides satisfactory echo cancellation the start-up period is somewhat too long. The start-up period consists of a dialogue between the remote apparatus and the modem, and is a necessary preliminary before commencing transmission of useful data between them. This is described in C.C.I.T.T. standards V32 and V32bis in particular.

SUMMARY OF THE INVENTION

The present invention aims to improve on the modem described in the abovementioned European Patent Application, by reducing the duration of the start-up phase or, equivalently, reducing the phase error for a given start-up duration.

To achieve this, during start-up, the said control means performs the following steps:

estimation of the energy of the echo over a time corresponding to a certain number of transmitted data symbols, assignment of this echo energy to a quantized numerical level, and tracking adjustment of the filter coefficients and of the phase-shifting unit on the basis of the assigned energy level of the echo energy.

DESCRIPTION OF THE DRAWINGS

The following description given in connection with the appended drawings, the whole given by way of non-limiting example, will elucidate the manner in which the invention can be realigned and utilized. In the drawings.

DESCRIPTION OF THE PREFERRED EMBODIMENTS

Figure 1:
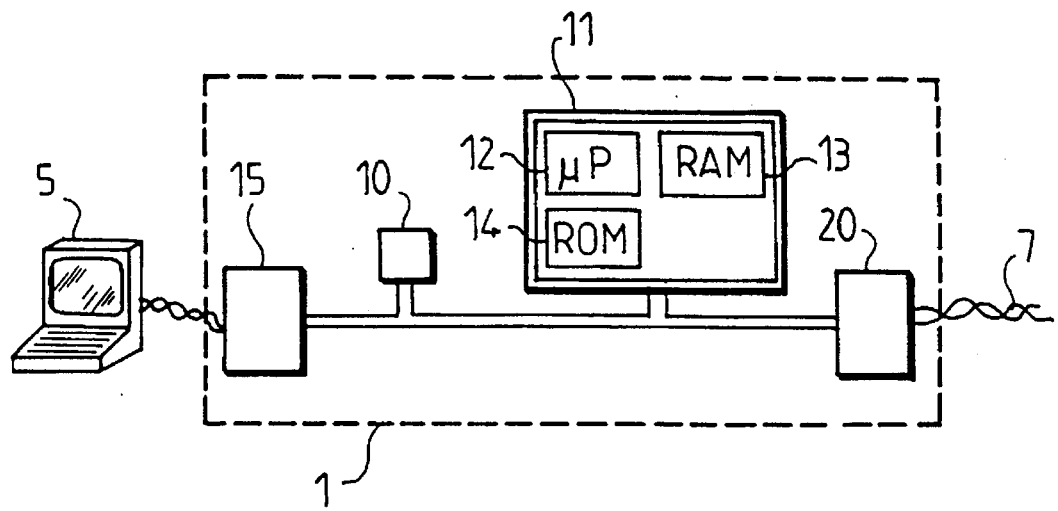
FIG. 1 shows a modem in accordance with the invention.

The modem 1 in FIG. 1 interconnects a data terminal 5 with a telephone transmission line 7. The modem includes microprocessor assemblies 10 and 11. Assembly 10 is assigned to management of the modem, and assembly 11 contains, in the customary manner, a microprocessor 12, a random-access working memory 13 and a read-only memory 14 storing the program of operation by which the invention is to be implemented. A first interface circuit 15 enables the modem 1 and the terminal 5 to be linked. A second interface circuit 20 makes it possible to transform on the one hand the signals originating from the telephone line 7 into digital signals, and on the other hand to carry out the reverse operation. Such a circuit is described in European Patent EP 0 318 105.

Assembly 11 performs various functions, and in particular that of echo cancellation. This function is illustrated in the form of functional blocks in FIG. 2.

In this figure, the send port 45 is for the data symbols A(n) which are intended to be transmitted. These data symbols appear at instants defined by integral multiples "n" of the data period T, and so at instants nT. These data symbols may be oversampled relative to the baud frequency of the sent data, so that we can write:

$$n = n'.R$$

where n' represents the period of occurrence of the symbols and R the oversampling factor. In this case, there would be R echo sub-cancellers. At receive port 46 data from a remote apparatus is received. A transversed filter 50 multiplies samples of the transmitted data A(n), shifted in time, by time-dependent constants. The purpose of this filter 50 is to simulate a near echo, so that a subtraction unit 52 makes it possible to remove unwanted near echo signals by means of the simulation provided by the filter 50.

Figure 2:
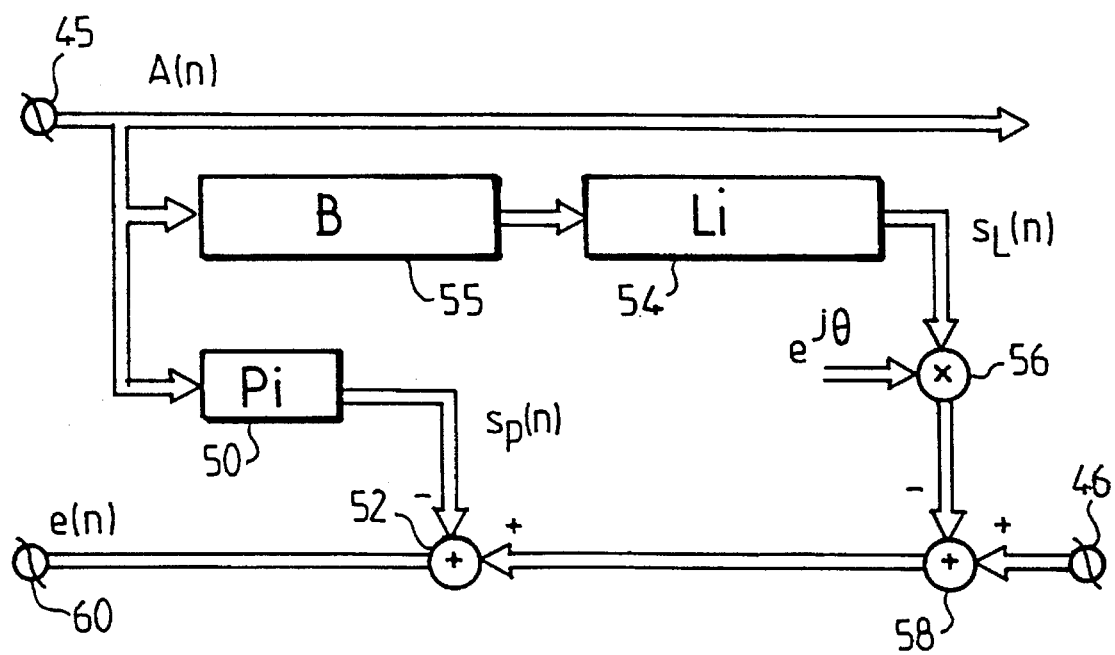
FIG. 2 is a functional diagram for explaining the functioning of the invention.

Another transversal filter 54 multiplies various samples of the transmitted data A(n), shifted in time, by time-dependent coefficients. The purpose of this filter 54 is to simulate a distant echo. Since these distant echoes are subject to a certain frequency drift, a phase-shifting unit simulates this drift. It is represented in FIG. 2 in the form of a multiplying unit 56 which multiplies the output signals from the filter 54 by $e^{j\hat{\theta}}$ where $\hat{\theta}$ is the phase of the estimated distant echo. A delay unit 55 makes it possible to operate the filter 54 under correct simulated conditions. A replica of a distant echo is thus constructed, so that a subtraction unit 58 can remove the unwanted signals due to this distant echo.

At the output of the filter 54, there is a signal:

$$S_L(n) = \sum_{i=0}^{M-1} L_i(n) \cdot A(n - B - i) \tag{1}$$

where $L_i$ are the coefficients of the filter, M their number, and B is the delay provided by the unit 55.

Similarly, at the output of the filter 50 there is a signal:

$$S_P(n) = \sum_{i=0}^{M'-1} P_i(n) \cdot A(n - i) \tag{2}$$

where $P_i$ are the coefficients of the filter, and M' is their number.

While in the start-up phase, an interval is provided during which the remote apparatus remains silent and hence sends no data. Thus the signal received R(n) represents only the echo signal which the echo cancellers will try to cancel, and this results in a final error signal:

$$e(n) = R(n) - S_L(n) \cdot e^{j\hat{\theta}(n)} - S_P(n) \tag{3}$$

To adjust the values of the coefficients $L_i$ and $P_i$, use is made of a stochastic gradient method such as described in section 18 of the text entitled: "DIGITAL COMMUNICATION" by E. A. LEE and D. G. MESSERSCHIMITT published by KLUWER ACADEMIC PUBLISHER (London—GB).

For example, the values of the coefficients $L_i$ are given by:

$$L_i(n+1)=L_i(n)+\alpha e(n)\overline{A}(n-B-i) \quad (4)$$

where $\overline{A}$ is the conjugate value of A and $\alpha$ is the adaptation gain which controls the rate of convergence. The quadratic error decreases exponentially until it reaches a residual level due mainly to the noise. The time constant of this error decrease is given by:

$$\tau=T/(2\alpha\sigma^2)$$

where $\sigma^2=E[|A|^2]$ represents the power of the data sent.

As regards the phase, it is determined by means of a cost function I(n) which considers the imaginary part of a quantity:

$$I(n)=\Im m[\overline{S}_L(n).e^{j-\hat{\theta}(n)}.e(n)] \quad (5)$$

which can also be put into the form:

$$E(I^2(n))=E_0 \sin(\theta(n)-\hat{\theta}(n))\approx E_0[\theta(n)-\hat{\theta}(n)]$$

Figure 3:
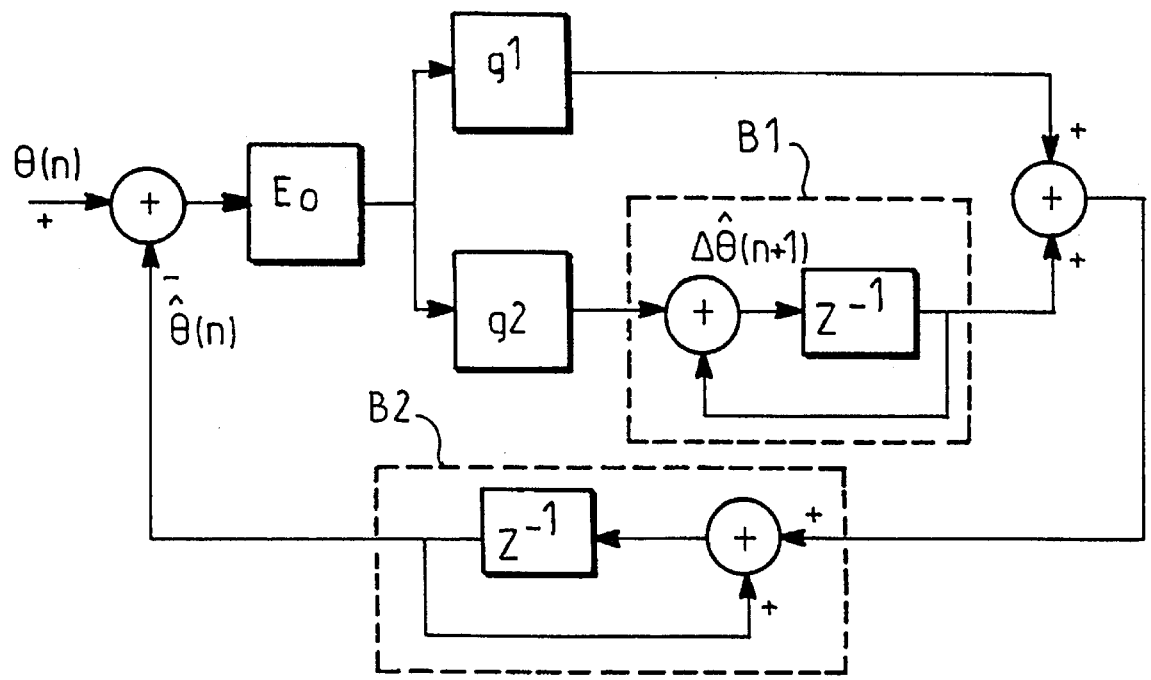
FIG. 3 is a functional block diagram showing phase correction in the sampling domain.
Figure 4:
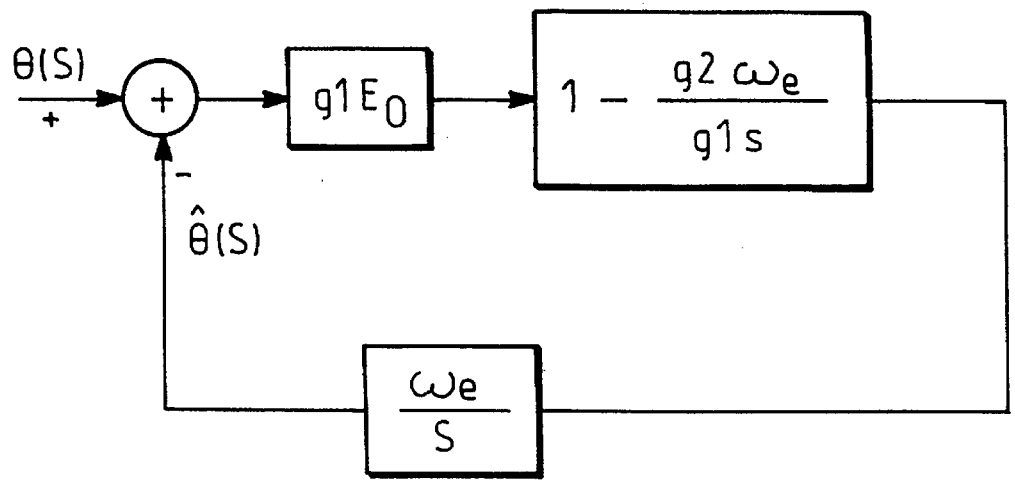
FIG. 4 is a functional block diagram corresponding with that of FIG. 3, phase correction in the frequency domain.

The procedure for determining the value $\hat{\theta}(n)$ is then defined. This procedure is described in the article entitled: "A Phase Adaptive Structure for Echo Cancellation" by R. D. Gitlin and J. S. Thompson, published in the I.E.E.E. Journal Transaction on Communication, Vol. Com-26, No. 8 August 1978, pp. 1211–1220. Reference will be made to formulae 6.9 and 6.10 on pp. 1919 of that publication, which may be rewritten as $$\Delta\hat{\theta}(n+1)=\Delta\hat{\theta}(n)+g_2 I(n) \quad (6)$$

$$\hat{\theta}(n+1)=\hat{\theta}(n)+\Delta\hat{\theta}(n)+g_1 I(n)$$

where $g_1$ and $g_2$ are constants which define the time-dependence of the procedure and $E_0$ is the power of the echo, that is to say:

$$E_o=E[|I_L(n)|^2] \quad (7)$$

assuming the estimate $S_L(n)$ to be exact. Equation (6) can be put into functional block diagram form as is represented in FIG. 3. Retaining the integration function such as shown in blocks B1 and B2, the functional block diagram of FIG. 4 is obtained in which:

$\omega_e$ represents the pulse sampling frequency, that is to say: $\omega_e = 2\Pi/T$ and s the Laplacian operator.

The transfer function is therefore deduced from this:

$$\frac{\theta(s)-\hat{\theta}(s)}{\theta(s)} = \frac{S^2}{S^2 + g_1 E_0 \omega_e S + g_2 \omega_e^2 E_0} \quad (8)$$

and hence, by introducing the damping factor $\zeta$ and the natural frequency $\omega_n$:

$$\frac{\theta(s)-\hat{\theta}(s)}{\theta(s)} = \frac{S^2}{S^2 + 2\zeta\omega_n S + \omega_n^2} \quad (9)$$

and comparing terms we obtain:

$$\omega_n = \sqrt{g_2 E_0}\ \omega_e \quad (10)$$

$$\zeta = \frac{g_1 E_0}{2\sqrt{g_2 E_0}}$$

It is noted that the convergence and stability of the distant echo cancelling loop depend strongly on the power of the echo. The invention therefore proposes for said loop:

(1) a time constant $\tau \ll 1/\Delta f_{MAX}$. The value $\Delta f_{MAX}$ represents the maximum frequency drift of the distant echo and cannot exceed 1 Hz when dealing with apparatus complying with the C.C.I.T.T. standards. Hence $\Delta f_{MAX}=1$ Hz (2) an adaptation gain $\alpha$ equal to the optimal gain $\alpha_{opt}$ such as given in the above-cited textbook, namely $$\alpha_{opt}=1/(M\sigma^2)$$

which gives in principle:

$$\tau = \frac{MT}{2} \quad (11)$$

(3) making an estimate of the echo power $E_0$ during a first step of convergence, which is therefore used for implementation of the procedure described.

This energy is estimated as follows:

$$\hat{E}_0(n+1)=(1-\lambda)\hat{E}_0(n)+\lambda|S_L(n)|^2 \quad (12)$$

where $\lambda$ is the integration constant. This evaluation is performed at the sample tempo, that is to say R times per symbol. The duration of this step lasts around 500 symbols. During this step the phase recovery algorithm is disabled.

(4) determination of an integer p such that:

$$K2^{-p} > \hat{E}_0 \geq K2^{-(p-1)} \quad (13)$$

where K is the dynamic range according to which the power of the distant echo may be estimated, or put differently K represents the maximum number of binary elements according to which the power of the echo is estimated. In practice, using K=18 binary elements in a word format of 24 binary elements, K will be bracketed to within 3 dB.

(5) During a third step, the procedure is begun with gains:

$$g_1=G_1 2^p$$

$$g_2=G_2 2^p$$

where the parameters $G_1$ and $G_2$ are defined for $E_0=K$. The gains $g_1$ and $g_2$ decrease staircase-fashion during this step while keeping:

$$\zeta=0.7$$

(we have not used $\omega_n=0.5\omega_e$).

As a variant, to be faster still, the invention proposes to consider only the M/2 central coefficients of the echo canceller during the first step. Then, convergence of the canceller is faster and it can estimate echo power for phase shifts greater than 1 Hz—see relation (11). The estimate of $E_0$ is not affected thereby since the central coefficients are the largest.

The proposed method consists in measuring the mean power of the signal received during the first phase of the synchronization sequence for the modem such as described in the C.C.I.T.T. standards. Once this power is measured, the adaptation gain of the following phases of the synchronization sequence is then selected.

What is claimed is:

1. A start-up method for a data modem having an echo cancellation loop coupled between a send port and a receive port thereof; said loop including a transversal filter having adjustable coefficients and a phase shifter in cascade therewith for producing an adjustable phase shift, said cascade producing a simulated echo signal from a send port data signal, a subtractor for deriving a possible echo error signal by subtracting the simulated echo signal from a receive port data signal received in response to the send port data signal, and a data processor for adjusting the coefficients of the transversal filter and the phase shift of the phase shifter so as to cancel said possible echo error signal; said method comprising the steps of:

(i) supplying a series of data samples at said send port;

(ii) iteratively adjusting the coefficient values of said filter in accordance with a gradient which results in an exponentially decreasing quadratic error of said coefficient values;

(iii) providing said echo cancellation loop with an adaptation gain $\alpha$ which results in a time constant $\tau$ of said decreasing quadratic error which is less than the period of a maximum frequency drift of said simulated error signal;

(iv) estimating the power of said error simulation signal over a time period corresponding to a predetermined number of said series of data samples at the send port;

(v) assigning the estimated power to a numerical quantization level; and (vi) adjusting the phase shift produced by said phase shifter starting from an initial adjustment thereof determined by said numerical quantization level and a dynamic range K over which the power of said error simulation signal is estimated.

2. A method as claimed in claim 1, wherein the estimated power $\hat{E}_0$ of the echo simulation signal is quantized in accordance with $$K2^{-P} \geq \hat{E}_o \geq K2^{-p-1},$$

p being an integer.

3. A method as claimed in claim 2, further comprising adjusting the phase $\hat{\theta}$ of the simulated error signal in accordance with $$\Delta\hat{\theta}(n+1) = \Delta\hat{\theta}(n) + g_2 I(n)$$

$$\hat{\theta}(n+1) = \hat{\theta}(n) + \Delta\hat{\theta}(n) + g_1 I(n)$$

where I(n) is the imaginary part of a function of the simulated echo error signal, and $$g_1 = G_1 2^P$$

$$g_2 = G_2 2^P$$

where $G_1$ and $G_2$ are optimal coefficients of the transversal filter for an echo signal power corresponding to K.

4. A method is claimed in claim 1 wherein a limited number of the coefficients of said filter are taken into account during at least some of the steps (i)–(vi).

* * * * *